US012617164B2

(12) United States Patent
Shen et al.

(10) Patent No.: US 12,617,164 B2
(45) Date of Patent: May 5, 2026

(54) DELAMINATION AND EDGE DAMAGE REPAIR ON THERMOPLASTIC COMPOSITES

(71) Applicant: ROHR, INC., Chula Vista, CA (US)

(72) Inventors: Shyan Bob Shen, San Diego, CA (US); Michael van Tooren, San Diego, CA (US); Christian Soria, La Mesa, CA (US); Taylor J Mehelic, Homeland, CA (US); Jeffrey D Woods, Beaumont, CA (US); Roberto Ramos, Moreno Valley, CA (US)

(73) Assignee: ROHR, INC., Chula Vista, CA (US)

( * ) Notice: Subject to any disclaimer, the term of this patent is extended or adjusted under 35 U.S.C. 154(b) by 107 days.

(21) Appl. No.: 18/409,154

(22) Filed: Jan. 10, 2024

(65) Prior Publication Data

US 2025/0222666 A1    Jul. 10, 2025

(51) Int. Cl.
*B29C 73/34* (2006.01)
*B29C 65/08* (2006.01)
*B29L 31/30* (2006.01)

(52) U.S. Cl.
CPC .............. *B29C 73/34* (2013.01); *B29C 65/08* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 2023/0182408 A1* | 6/2023 | Rolfes | B32B 7/14 |
| | | | 428/98 |
| 2023/0347603 A1* | 11/2023 | Dworak | B29C 37/0075 |
| 2023/0382060 A1* | 11/2023 | Nelson | B29C 66/721 |
| 2024/0391179 A1* | 11/2024 | van Tooren | B29C 73/10 |

FOREIGN PATENT DOCUMENTS

| | | |
|---|---|---|
| CN | 106891555 | 6/2017 |
| CN | 111070697 | 4/2020 |
| EP | 4467322 | 11/2024 |
| WO | 2015018377 | 2/2015 |

OTHER PUBLICATIONS

European Patent Office, European Search Report dated May 23, 2025 in Application No. 25151029.3.

* cited by examiner

*Primary Examiner* — Michael N Orlando
*Assistant Examiner* — Abhishek A Patwardhan
(74) *Attorney, Agent, or Firm* — SNELL & WILMER L.L.P.

(57) ABSTRACT

A method of repairing a thermoplastic composite material is disclosed herein. The method includes placing the thermoplastic composite material on a supporting anvil, placing an energy transmission material on top of the thermoplastic composite material, and applying an ultrasonic welder to the thermoplastic composite material to consolidate and repair the thermoplastic composite material. Another method of repairing a thermoplastic composite material is disclosed herein. The method includes placing an energy transmission material on a supporting anvil, placing the thermoplastic composite material on top of the energy transmission material, and applying an ultrasonic welder to the energy transmission material to consolidate and repair the thermoplastic composite material.

20 Claims, 4 Drawing Sheets

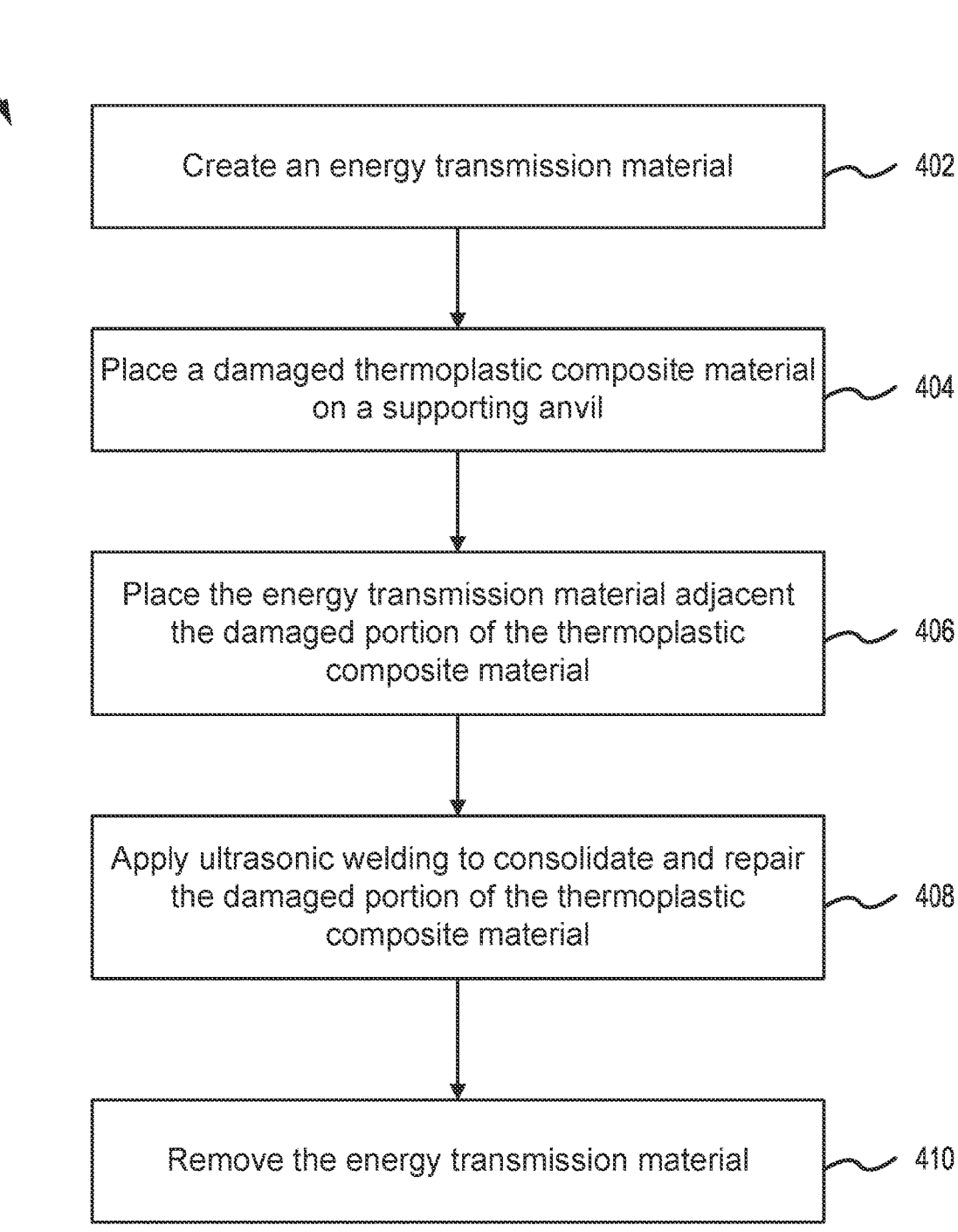

400

402 — Create an energy transmission material

404 — Place a damaged thermoplastic composite material on a supporting anvil

406 — Place the energy transmission material adjacent the damaged portion of the thermoplastic composite material 408 — Apply ultrasonic welding to consolidate and repair the damaged portion of the thermoplastic composite material 410 — Remove the energy transmission material

FIG. 4

DELAMINATION AND EDGE DAMAGE REPAIR ON THERMOPLASTIC COMPOSITES

FIELD

The present disclosure generally relates to the field of aerostructures, and more particularly, to damage repair of thermoplastic composites.

BACKGROUND

An aircraft may include several aerostructures including a fuselage, interior parts, wings, a tail assembly, and nacelles, among others. Flight control surfaces, such as the wings and the tail, are configured to affect the yaw, roll and pitch of the aircraft during flight. Such flight control surfaces may include, for example, ailerons to affect the roll about a longitudinal axis, a rudder to affect the yaw about a vertical axis and an elevator to affect the pitch about a lateral axis, each axis being with respect to a coordinate system associated with the aircraft. Additional flight control surfaces include trailing edge flaps configured to affect the lift of a wing, leading edge slats configured to affect the stall speed of a wing and spoilers, generally located adjacent to and forward of the trailing edge flaps and configured to disrupt the airflow over a wing surface to reduce lift or to increase drag. Flight control surfaces are typically airfoil-like components configured to alter the flow of air about the wings or tail structure of the aircraft. Aerostructures, such as the fuselage and nacelles are configured to protect other structures, such as internal portions of the aircraft and the engines, respectively. Notwithstanding the simple shapes, aerostructures should possess sufficient structural integrity to withstand the forces applied during use over the operational life of the aircraft. Aerostructure exhibiting low weight and high strength may be fabricated thermoplastic materials. Thermoplastic materials are increasingly being used in various aerospace applications for the combination of benefits as light weight, high toughness, no storage time limit at room temperature, fast fabrication, fast assembly and suitable for automated manufacturing.

SUMMARY

Disclosed herein is a method of repairing a thermoplastic composite material. The method includes placing an energy transmission material on a supporting anvil, placing the thermoplastic composite material on top of the energy transmission material, the thermoplastic composite material including at least one of delamination, a single edge damage, or a plural edge damage, and applying an ultrasonic welder to the energy transmission material to consolidate and repair the thermoplastic composite material.

In various embodiments, the method further includes creating the energy transmission material including a soft plastic and/or an elastomer. In various embodiments, the creating the energy transmission material further includes forming a matrix of an elastomeric material and forming a fiber reinforcement in the matrix of the elastomeric material. In various embodiments, the creating the energy transmission material further includes forming a plurality of layers including forming a first layer of the plurality of layers, forming a second layer of the plurality of layers on the first layer, and forming a third layer of the plurality of layers on the second layer.

In various embodiments, at least one of the plurality of layers includes a flexible elastomeric material. In various embodiments, the at least one of the plurality of layers includes a rigid material. In various embodiments, the energy transmission material is a flexible body. In various embodiments, the energy transmission material includes a flexible elastomeric material. In various embodiments, the flexible elastomeric material includes polytetrafluoroethylene, fluoroelastomer, silicone rubber, chlorosulphonated polyethene rubber, ethylene-propylene-diene monomer, or hydrogenated acrylonitrile-butadiene rubber and polyurethane. In various embodiments, the method further includes forming the energy transmission material of a plurality of layers, wherein at least one layer includes a flexible elastomeric material and at least one other layer includes a rigid material.

Also disclosed herein is a method of repairing a thermoplastic composite material. The method includes placing the thermoplastic composite material on a supporting anvil, the thermoplastic composite material including at least one of delamination, a single edge damage, or a plural edge damage, placing an energy transmission material on top of the thermoplastic composite material, and applying an ultrasonic welder to the thermoplastic composite material to consolidate and repair the thermoplastic composite material.

In various embodiments, the method further includes creating the energy transmission material including a soft plastic and/or an elastomer. In various embodiments, the creating the energy transmission material further includes forming a matrix of an elastomeric material and forming a fiber reinforcement in the matrix of the elastomeric material. In various embodiments, the creating the energy transmission material further includes forming a plurality of layers including forming a first layer of the plurality of layers, forming a second layer of the plurality of layers on the first layer, and forming a third layer of the plurality of layers on the second layer. In various embodiments, at least one of the plurality of layers includes a flexible elastomeric material.

In various embodiments, the at least one of the plurality of layers includes a rigid material. In various embodiments, the energy transmission material is a flexible body. In various embodiments, the energy transmission material includes a flexible elastomeric material. In various embodiments, the flexible elastomeric material includes polytetrafluoroethylene, fluoroelastomer, silicone rubber, chlorosulphonated polyethene rubber, ethylene-propylene-diene monomer, or hydrogenated acrylonitrile-butadiene rubber and polyurethane. In various embodiments, the method further includes forming the energy transmission material of a plurality of layers, wherein at least one layer includes a flexible elastomeric material and at least one other layer includes a rigid material.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 4 illustrates a flow diagram of a method for damage repair of thermoplastic composites, in accordance with various embodiments.

DETAILED DESCRIPTION

Figures 1A, 1B:
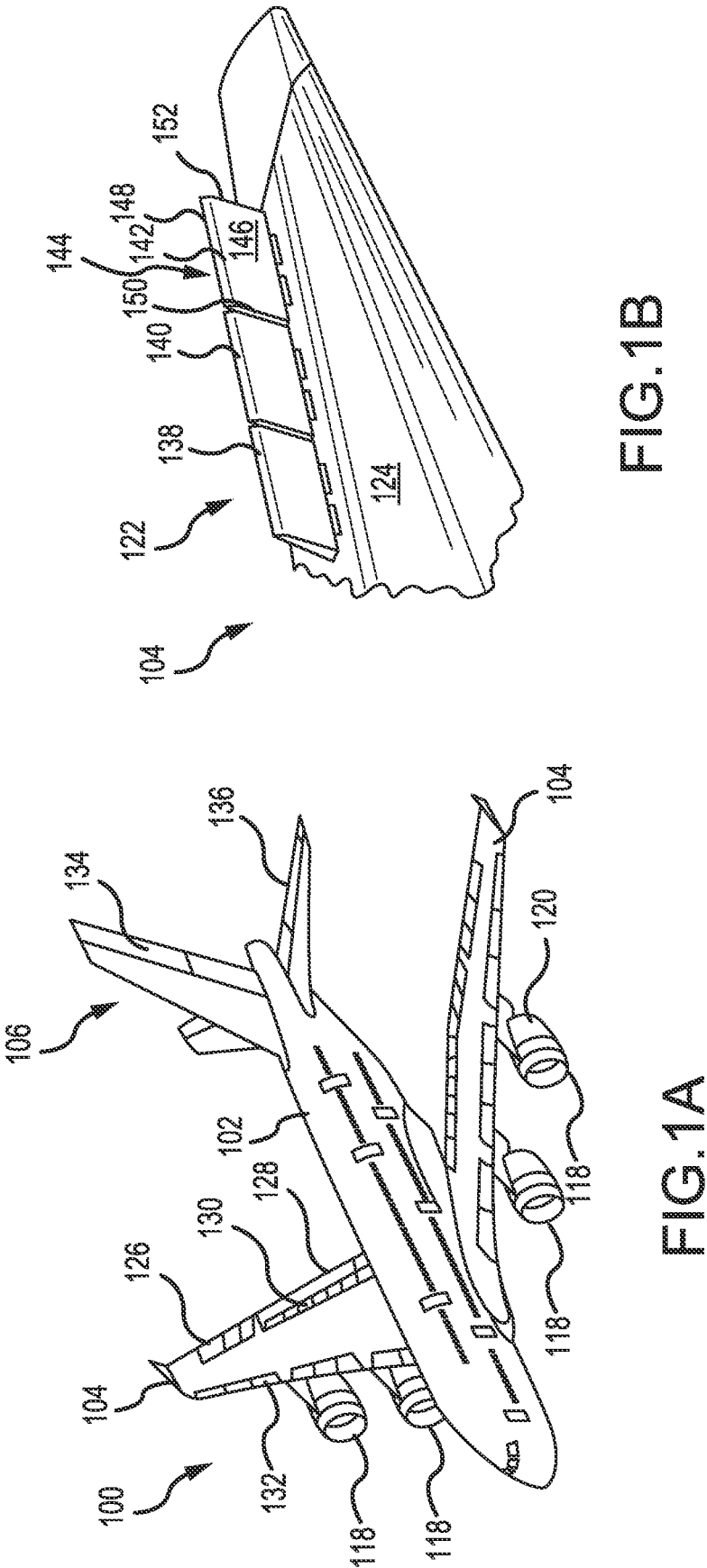
FIGS. 1A and 1B illustrate and aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Thermoplastic composites have become popular for use on aircraft structures, or aerostructures. Repair processes for delamination and/or edge damage on thermoplastic composites are being developed. Standard repair of delamination and/or edge damage on thermoset composites tends to include resin injection but it cannot be applied on thermoplastic composites. Generally, repair of thermoplastic composites, or reconsolidation repair, includes the use of heating blankets, vacuum bags, and other components. This system of repair is time-consuming and therefore expensive. Additionally, heating through the thickness on large areas of thermoplastic composites tends to create residual stress and may cause thermal damage to the adjacent parts.

Disclosed herein are systems and methods for delamination and edge damage repair on thermoplastic composites. In various embodiments, an ultrasonic welder may be used to consolidate and repair the delamination and/or edge damage of the thermoplastic composite. In various embodiments, the damaged thermoplastic composite may be placed on a support anvil, which is a solid work surface. In various embodiments, an energy transmission material may be placed on top of the thermoplastic composite and between the thermoplastic composite and the ultrasonic welder. In various embodiments, the energy transmission material may be placed beneath the thermoplastic composite and between the thermoplastic composite and the supporting anvil.

The systems and methods disclose herein, in their various embodiments, tend to reduce the amount of time to effect repairs on thermoplastic composites. In various embodiments, the repair and heating works in a local area and tends to minimize thermal impact and/or damage to adjacent parts. In various embodiments, the systems and methods disclosed herein may be mobile allowing for field repair and/or emergency field repair in most locations.

The various embodiments addressed herein each may be characterized as being in the form of an "aerostructure," or aircraft structure. The term "aerostructure," as used in this disclosure, means a unit, component, section, or any portion or combination of portions of an aircraft or other vehicle that is capable of flight, where "vehicle" includes any structure that is used to transport one or more payloads of any appropriate type (e.g., cargo, personnel) and including without limitation manned or unmanned flight vehicles such as an aircraft. Representative aircraft in accordance with the foregoing includes without limitation airplanes, unmanned arial vehicles, helicopters, and the like. An aerostructure in accordance with this disclosure may be in the form of a fuselage, interior part, nacelle, rudder, elevator, aileron, fin, wing tip, flap, slat, spoiler, trim tab, stabilizer, or external antennae for a flight vehicle, as appropriate.

FIGS. 1A and 1B illustrate an aircraft 100, in accordance with various embodiments. Aircraft 100 includes a fuselage 102, a pair of wings 104, and a tail assembly 106. One or more propulsion systems 118 (e.g., a turbofan gas turbine engine with a nacelle assembly 120) may be coupled to aircraft 100 (e.g., mounted on the underside of a wing 104). The one or more propulsion systems 118 may be configured to provide at least one of forward thrust or propulsion for aircraft 100.

In various embodiments, the one or more propulsion systems 118 may comprise an engine including a fan and an engine core, housed within a nacelle assembly 120. The typical nacelle assembly, or more simply a nacelle 120, may comprise an inlet, a fan cowl, a thrust reverser, and an exhaust system. Nacelle 120 surrounds the engine core providing smooth aerodynamic surfaces for airflow around and into the engine. Nacelle 120 also helps define a bypass air duct through the one or more propulsion systems 118. In various embodiments, the fan may draw and direct a flow of air into and through the one or more propulsion systems 118. After the fan, the air is divided into two principal flow paths, one flow path through engine core (i.e., a "core airflow"), and another flow path through a bypass air duct (i.e., a "bypass airflow"). The engine core flow path is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's compressor and fan. The high-pressure exhaust gases from the combustion of the fuel and air mixture are thereafter directed through an exhaust system aft of the engine for thrust.

Wings 104 include a plurality of spoilers 122 disposed along an upper surface 124 of each wing 104, with each of the plurality of spoilers 122 illustrated in a deployed position. The variety of control surfaces typically used on wings 104 of aircraft 100 may include, for example, an aileron 126, a trailing edge flap 128, a spoiler 130, disposed adjacent to and forward of trailing edge flap 128, and a leading-edge slat 132. Similarly, the variety of control surfaces typically used on tail assembly 106 of aircraft 100 may include, for example, a rudder 134 and an elevator 136. While the foregoing description of the variety of control surfaces generally refers to each control surface as a single component, it will be appreciated that, in various embodiments, each individual component, e.g., spoiler 130, may be a single component within a plurality of like components, e.g., the plurality of spoilers 122, as illustrated in FIG. 1B. For example, with reference to FIG. 1B, the plurality of spoilers 122 may, in various embodiments, include a first spoiler 138, a second spoiler 140, and a third spoiler 142. In various embodiments, each one of the plurality of spoilers 122 includes an upper surface 144 and a lower surface 146 opposite the upper surface 144, a trailing edge 148, and an inboard end 150 (or a first end), and an outboard end 152 (or a second end).

In various embodiments, aerostructures, such as those forming portions of a fuselage 102, wings 104, tail assembly 106, nacelles 120, and other structural components of aircraft 100, increasingly include thermoplastic composite materials. Aircraft aerostructure materials utilized to form such aerostructures may be selected to provide suitable structural strength, rigidity, and impact resistance while also minimizing aerostructure weight. In particular, thermoplastic composite materials are increasingly being used for aerostructure parts in order to reduce aerostructure weight and manufacturing costs, for example, in comparison to conventional metal (e.g., aluminum) and thermoset materials. Improved methods for repairing the thermoplastic composite materials are needed.

Figure 2:
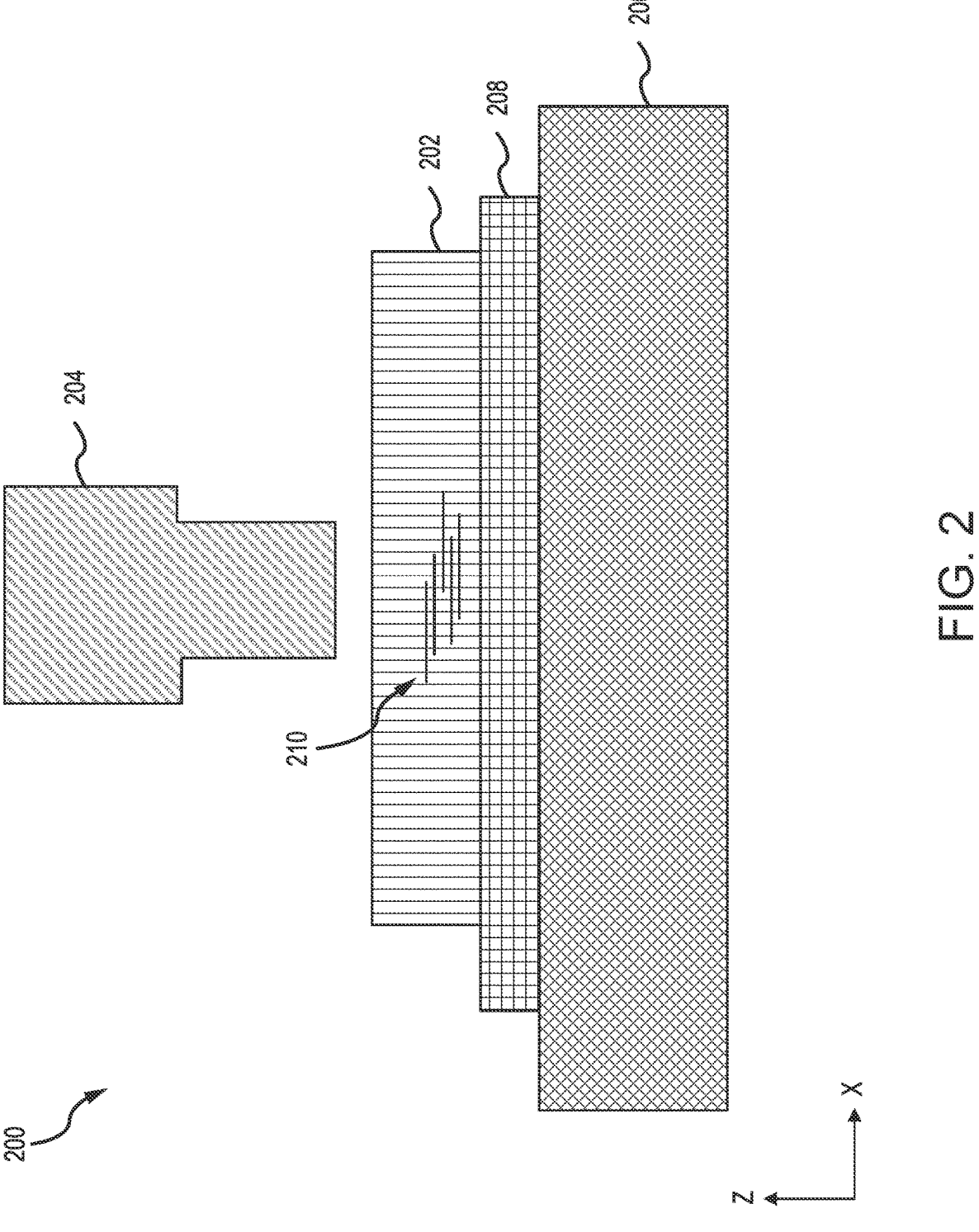
FIG. 2 illustrates a system for repairing damage to thermoplastic composites, in accordance with various embodiments.

Referring now to FIG. 2, a system 200 for repairing damage on a thermoplastic composite material 202 is illustrated, in accordance with various embodiments. System 200 includes an ultrasonic welder 204, a supporting anvil 206, and an energy transmission material 208. A portion 210 of thermoplastic composite material 202 may be damaged and be brought to system 200 for repair. In various embodiments, the damage may include the delamination layers within thermoplastic composite material 202. In various embodiments, the damage may include edge damage of thermoplastic composite material 202. In various embodiments, the damage may be external to and/or externally visible from thermoplastic composite material 202. In various embodiments, the damage may be internal to and/or not externally visible from thermoplastic composite material 202. Energy transmission material 208 is placed on supporting anvil 206. Thermoplastic composite material 202 is placed on energy transmission material 208 so that portion 210 that is damaged is over (e.g., in the positive z-direction) energy transmission material 208. That is, energy transmission material 208 is between thermoplastic composite material 202 and supporting anvil 206. Ultrasonic welder 204 may then be used to repair thermoplastic composite material 202.

Thermoplastic composite material 202 may, in various embodiments, include a thermoplastic matrix and/or fiber-reinforcement embedded within the thermoplastic matrix. Examples of the thermoplastic matrix include, but are not limited to, a semi-crystalline thermoplastic resin and an amorphous thermoplastic resin. Examples of the semi-crystalline thermoplastic resin include polyester, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terephthalate (PTT), polyethylene naphthalate (PEN), and liquid crystal polyester. An example of the polyarylene sulfide is polyphenylene sulfide (PPS). An example of the fluororesin is polytetrafluoroethylene. Examples of the amorphous thermoplastic resin include polycarbonate (PC), polymethyl methacrylate (PMMA), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic matrix materials.

The fiber-reinforcement may be arranged in one or more layers within thermoplastic composite material 202 and its thermoplastic matrix. Each layer of the fiber-reinforcement may include a plurality of fiber-reinforcement fibers such as metal fibers, carbon fibers, insulating fibers, organic fibers, and inorganic fibers. Examples of the metal fibers include aluminum fibers, brass fibers, and stainless steel fibers. Examples of the carbon fibers include graphite fibers such as polyacrylonitrile (PAN)-based carbon fibers, rayon-based carbon fibers, lignin-based carbon fibers, and pitch-based carbon fibers. The present disclosure, however, is not limited to the foregoing exemplary fiber-reinforcement materials.

Supporting anvil 206 may, in various embodiments, be a surface or structure that is able to withstand the heat generated by ultrasonic welder 204 in thermoplastic composite material 202. In various embodiments, supporting anvil 206 may be heated to over 600° F. (350° C.) without deforming. In various embodiments, supporting anvil 206 may include a metal or other composite material. In various embodiments, supporting anvil 206 may be a surface and/or material that is below thermoplastic composite material 202 where thermoplastic composite material 202 is installed. This allows for repairs to thermoplastic composite material 202 in place and without removing thermoplastic composite material 202.

Ultrasonic welder 204 is positioned over thermoplastic composite material 202 and energy transmission material 208. Ultrasonic welder 204 may alternatively be referred to as an ultrasonic horn, a sonotrode, or inducer, among other names. In various embodiments, the ultrasonic welder 204 is configured to repair thermoplastic composite material 202. The terminology "repair" may include "weld," "join," or "melt" and means the consolidation of thermoplastic material using heat and/or pressure.

In various embodiments, the ultrasonic welder 204 emits low-amplitude acoustic vibrations that melt thermoplastic composite material 202, including portion 210, thereby welding, or repairing, damaged portion 210 of thermoplastic composite material 202. In various embodiments, common frequencies used in ultrasonic welding of thermoplastics include, but are not limited to 15 kHz, 20 kHz, 30 kHz, 35 kHz, or 40 kHz, among others. In various embodiments, the ultrasonic welding performed by ultrasonic welder 204 may be via spot ultrasonic welding or continuous ultrasonic welding. In various embodiments, spot welding includes utilizing an n-inch by n-inch sonotrode that is moved about the surface of thermoplastic composite material 202, including damaged portion 210, for a predetermined time period to repair damaged portion 210. In various embodiments, the continuous ultrasonic welding includes a sonotrode traveling continuously, at a predetermined speed, over the surface of energy transmission material 208 and thermoplastic composite material 202 applying the ultrasonic vibrations to repair damaged portion 210 with limited heat generated in adjacent portions.

Energy transmission material 208 tends to enable the normal vibration of ultrasonic welder 204 to be absorbed by damaged portion 210 as a normal vibration that will create friction between the layers to create the initial heating to start the welding process and weld delamination layers together. That is, energy transmission material 208 tends to be more flexible than thermoplastic composite material 202 so that friction, and therefore heat, is more readily generated in energy transmission material 208 than in thermoplastic composite material 202. This extra heat tends to decrease the time needed to repair damage in thermoplastic composite material 202. Supporting anvil 206 tends to focus waves from ultrasonic welder 204, and energy transmission material 208, and maintain the energy at the desired location. Without supporting anvil 206, the normal vibration may be transformed into transverse and/or bending waves that transport the energy away from the intended weld zone (i.e., portion 210) and can cause hot spots in thermoplastic composite material 202 away from the intended weld area, at the edges of thermoplastic composite material 202, and/or even in components adjacent to thermoplastic composite material 202.

In various embodiments, energy transmission material 208 may be a flexible (e.g., non-rigid, compliant, pliable, etc.) body. In various embodiments, energy transmission material 208, and its body, may include one or more layers. In various embodiments, each of these layers may be a flexible layer of material. In various embodiments, energy transmission material 208, and its body for example, may include one or more layers of flexible elastomer or plastic material. Examples of the elastomer material include polytetrafluoroethylene (e.g., that sold under the mark Teflon®), fluoroelastomer, silicone rubber, chlorosulphonated polyethene rubber, ethylene-propylene-diene monomer, hydrogenated acrylonitrile-butadiene rubber and polyurethane, where fiber reinforcement may or may not be disposed within a matrix of the elastomer material. In various embodiments, energy transmission material 208, and its body, may additionally, or alternatively, include one or more layers of flexible elastomeric material. In various embodiments, one or more of the layers of energy transmission material 208 may alternatively be formed from a more rigid material such as metal. Examples of the metals and metal alloys include stainless steel, titanium (Ti), alloys of Ti, copper (Cu), alloys of Cu, and bronze, among others. In various embodiments, energy transmission material 208, and its body for example, may also include one or more layers of metal (e.g., sheet metal layers, metal plates, etc.) The present disclosure, however, is not limited to the foregoing exemplary compositions nor layer arrangements of energy transmission material 208.

Figure 3:
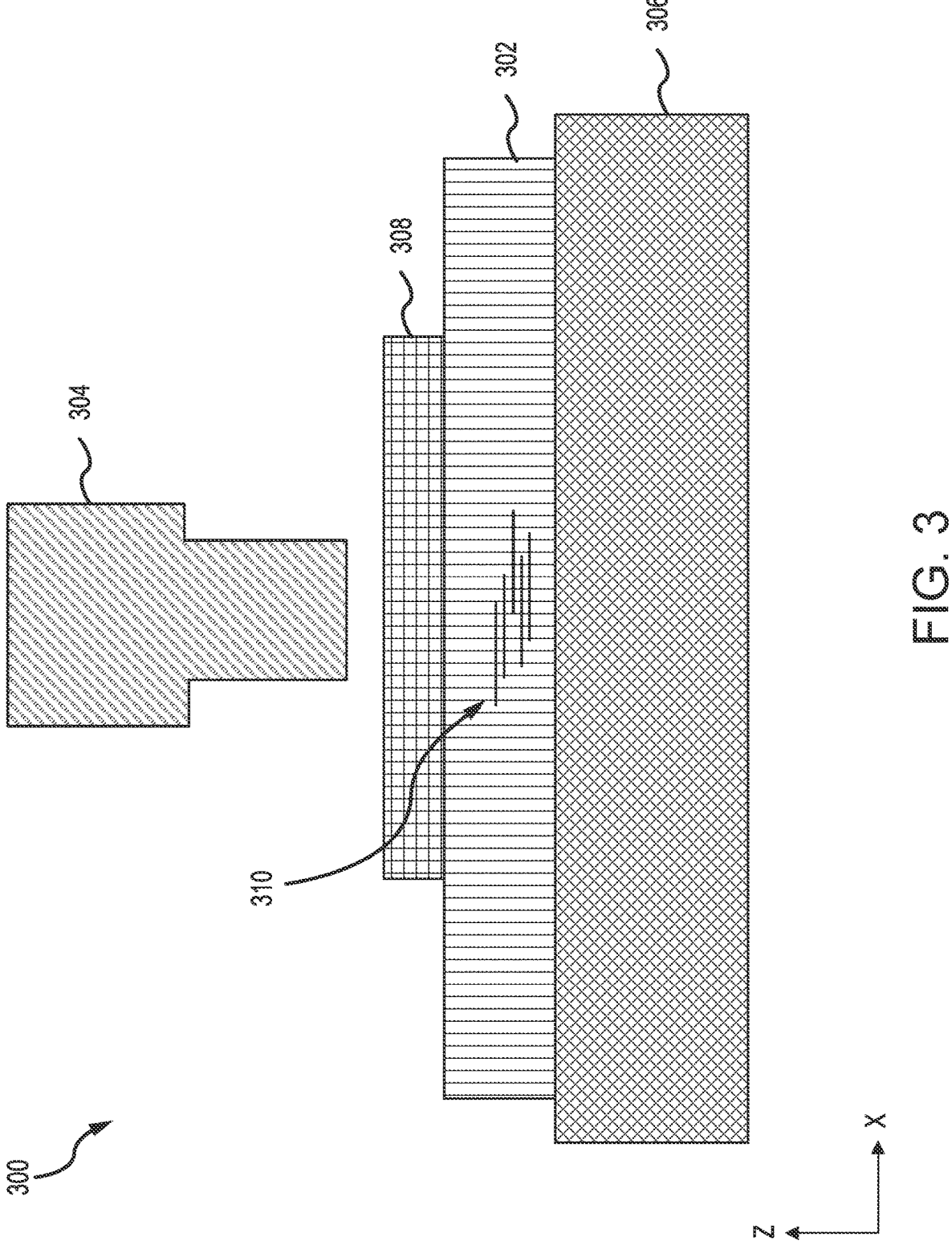
FIG. 3 illustrates a system for repairing damage to thermoplastic composites, in accordance with various embodiments.

Referring now to FIG. 3, a system 300 for repairing damage on a thermoplastic composite material 302 is illustrated, in accordance with various embodiments. System 300 includes similar components as system 200 described above in FIG. 2 including an ultrasonic welder 304, a supporting anvil 306, and an energy transmission material 308, descriptions of which will not be repeated below.

Thermoplastic composite material 302 includes a damaged portion 310. In various embodiments, the damage may include edge damage of thermoplastic composite material

302. In various embodiments, the damage may be external to and/or externally visible from thermoplastic composite material 302. In various embodiments, the damage may be internal to and/or not externally visible from thermoplastic composite material 302. Thermoplastic composite material 302, including damaged portion 310, is placed on supporting anvil 306. Energy transmission material 308 is placed on thermoplastic composite material 302 (e.g., in the positive z-direction) so that damaged portion 310 is under energy transmission material 308. That is, thermoplastic composite material 302 is between energy transmission material 308 and supporting anvil 306. The repair of thermoplastic composite material 302 may be performed the same as described above.

Referring now to FIG. 4, a flow diagram of a method 400 for repairing a thermoplastic composite material is illustrated, in accordance with various embodiments. At block 402, an energy transmission material is created. The energy transmission material may be energy transmission material 208, 308 described above in FIGS. 2 and 3. In various embodiments, the energy transmission material may be flat or curved. At block 404, a damaged thermoplastic composite material is placed on a supporting anvil. In various embodiments, the thermoplastic composite material may be thermoplastic composite material 202, 302 described above in FIGS. 2 and 3. In various embodiments, the supporting anvil may be supporting anvil 206, 306 described above in FIGS. 2 and 3. In various embodiments, anvil 206, 306 may be flat or curved to match the geometry of thermoplastic composite material 202, 302.

At block 406, the energy transmission material is placed adjacent the damaged portion of the thermoplastic composite material. In various embodiments, the energy transmission material may be placed on top of the thermoplastic composite material so that the thermoplastic composite material is between the energy transmission material and the supporting anvil. In various embodiments, the energy transmission material may be placed under the thermoplastic composite material so that the energy transmission material is between the thermoplastic composite material and the supporting anvil.

At block 408, an ultrasonic welder is used to consolidate and repair the damaged portion of the thermoplastic composite material. At block 410, the energy transmission material is removed from the thermoplastic composite material.

In one example, edge damage was intentionally crated in a thermoplastic matrix material (e.g., thermoplastic composite material 206, 306). Several 7-inch by 4-inch by 0.09-inch carbon-fiber-reinforced PAEK thermoplastic matrix material (CETEX® TC1225 sold by Toray Advanced Composites Netherlands B.V., Netherlands) panels were consolidated with a pair of 0.005-inch-thick steel shim inserted between the center layers. After consolidation, the steel shims were pulled out from the consolidated panels to create the artificial edge damage (e.g., a void or delamination). The shape of each of the artificial edge damage caused by the steel shims is an isosceles trapezoid with parallel sides of length 1-inch and 0.5-inch and each having a height of 0.5-inch. The panels were inspected by computed tomography X7500 (by North Star Imaging located in Rogers, Minnesota, USA) to record the edge damage location and dimension. For the repair, a 0.041 inch (0.105 centimeters) thick elastomer layer (trade name Air Tack M from Kinyo Germany GmbH) (e.g., energy transmission material 208, 308) was put on the top of steel anvil (e.g., anvil 206, 306) and the composite panel (e.g., thermoplastic composite material 202, 302) with the damage was placed on the elastomer layer. The spot ultrasonic welding repair was performed by using an USP 3000 Welding System (by Telsonic Ultrasonic, Bronschhofen, Switzerland) (e.g., ultrasonic welder 204, 304) with a 0.75-inch (1.91 centimeters) diameter sonotrode at a frequency of 20 kHz, a weld load of 337 pounds (153 kilograms), and a weld time of 7.0 seconds plus a hold time of 7.0 seconds. The repaired panels were inspected with computed tomography to record the edge damage location and dimension. As compared between the edge damage location and dimension before and after repair, the results showed the edge damage was completely recovered and the void disappeared.

For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. An individual component may be comprised of two or more smaller components that may provide a similar functionality as the individual component. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of repairing a thermoplastic composite material, comprising:
    placing an energy transmission material on a supporting anvil;
    placing the thermoplastic composite material on top of the energy transmission material, the thermoplastic composite material including at least one of delamination, a single edge damage, or a plural edge damage; and
    applying an ultrasonic welder to the energy transmission material to consolidate and repair the thermoplastic composite material.

2. The method of claim 1, further comprising:
    creating the energy transmission material including a soft plastic and/or an elastomer.

3. The method of claim 2, wherein the creating the energy transmission material further comprises:
    forming a matrix of an elastomeric material; and
    forming a fiber reinforcement in the matrix of the elastomeric material.

4. The method of claim 2, wherein the creating the energy transmission material further comprises forming a plurality of layers including:

forming a first layer of the plurality of layers;

forming a second layer of the plurality of layers on the first layer; and forming a third layer of the plurality of layers on the second layer.

5. The method of claim 4, wherein at least one of the plurality of layers includes a flexible elastomeric material.

6. The method of claim 4, wherein the at least one of the plurality of layers includes a rigid material.

7. The method of claim 1, wherein the energy transmission material is a flexible body.

8. The method of claim 1, wherein the energy transmission material includes a flexible elastomeric material.

9. The method of claim 8, wherein the flexible elastomeric material includes polytetrafluoroethylene, fluoroelastomer, silicone rubber, chlorosulphonated polyethene rubber, ethylene-propylene-diene monomer, or hydrogenated acrylonitrile-butadiene rubber and polyurethane.

10. The method of claim 1, further comprising:

forming the energy transmission material of a plurality of layers, wherein at least one layer includes a flexible elastomeric material and at least one other layer includes a rigid material.

11. A method of repairing a thermoplastic composite material, comprising:

placing the thermoplastic composite material on a supporting anvil, the thermoplastic composite material including at least one of delamination, a single edge damage, or a plural edge damage;

placing an energy transmission material on top of the thermoplastic composite material; and applying an ultrasonic welder to the thermoplastic composite material to consolidate and repair the thermoplastic composite material.

12. The method of claim 11, further comprising:

creating the energy transmission material including a soft plastic and/or an elastomer.

13. The method of claim 12, wherein the creating the energy transmission material further comprises:

forming a matrix of an elastomeric material; and forming a fiber reinforcement in the matrix of the elastomeric material.

14. The method of claim 12, wherein the creating the energy transmission material further comprises forming a plurality of layers including:

forming a first layer of the plurality of layers;

forming a second layer of the plurality of layers on the first layer; and forming a third layer of the plurality of layers on the second layer.

15. The method of claim 14, wherein at least one of the plurality of layers includes a flexible elastomeric material.

16. The method of claim 14, wherein the at least one of the plurality of layers includes a rigid material.

17. The method of claim 11, wherein the energy transmission material is a flexible body.

18. The method of claim 11, wherein the energy transmission material includes a flexible elastomeric material.

19. The method of claim 18, wherein the flexible elastomeric material includes polytetrafluoroethylene, fluoroelastomer, silicone rubber, chlorosulphonated polyethene rubber, ethylene-propylene-diene monomer, or hydrogenated acrylonitrile-butadiene rubber and polyurethane.

20. The method of claim 11, further comprising:

forming the energy transmission material of a plurality of layers, wherein at least one layer includes a flexible elastomeric material and at least one other layer includes a rigid material.

* * * * *